Figure 1:
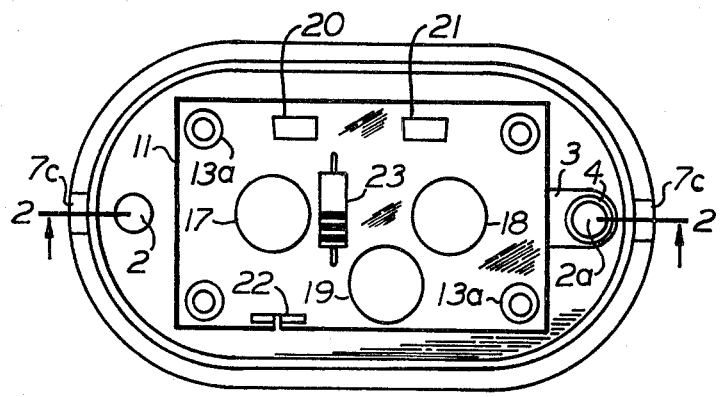

United States Patent [19]

Spiteri

[11] 4,128,860

[45] Dec. 5, 1978

[54] TRUCK MARKER LIGHT

[76] Inventor: Joseph Spiteri, P.O. Box 71, Harborcreek, Pa. 16421

[21] Appl. No.: 742,220

[22] Filed: Nov. 16, 1976

[51] Int. Cl.² ............................................. B60Q 1/26
[52] U.S. Cl. ...................................... 362/80; 307/64; 315/89; 340/642; 362/83
[58] Field of Search ................. 340/251, 46, 253 B, 340/253 S, 248 E; 315/88, 89, 90, 92; 307/64

[56] References Cited

U.S. PATENT DOCUMENTS

| | | | |
|---|---|---|---|
| 2,991,116 | 7/1961 | Andrews | 362/80 |
| 3,076,123 | 1/1963 | McDermott | 340/251 |
| 3,196,267 | 7/1965 | Abolins | 362/80 |
| 3,808,499 | 4/1974 | Edwards | 315/92 |
| 3,883,777 | 5/1975 | Morita | 315/88 |

Primary Examiner—Samuel W. Engle
Assistant Examiner—Ralph Palo
Attorney, Agent, or Firm—Ralph Hammar

[57] ABSTRACT

A marker or clearance light for semi trailers and the like which increases the life by a factor of from 3 to 10.

3 Claims, 6 Drawing Figures

U.S. Patent

Dec. 5, 1978

4,128,860

TRUCK MARKER LIGHT

By law semi trailers are required to have marker lights outlining the body. Under normal conditions the lights have a life of about 300 hours. When a light goes out, it must be replaced and the cost of replacement exceeds the cost of the light. Lights with two lamps have been proposed on the theory that both lamps will not burn out at the same time. This has made a very small improvement. When one lamp burns out, the other lamp is almost ready to go so the actual increase in life is only about 50 hours. It is cheaper to replace the entire unit when one lamp burns out rather than to take the risk of a high cost on-the-road replacement. The problem of marker lights has existed for a long time.

This invention is a dual lamp unit which makes a three to ten fold increase in life by a structure for absorbing vibration and for burning the lamps in sequence. Lamp filaments become brittle in use but unburned lamps remain ductile and are not affected by vibration. When applicant's second lamp is switched on, it has a filament in the same condition as a brand new lamp so that double life can be expected. However the vibration absorbing characteristics of the switching structure still further increase the life so that the life is increased by a factor of from 3 to 10. Instead of a life of from 300 to 350 hours, applicant gets a life of from 1000 to 3000 or 3500 hours. The unit works equally well with positive and negative ground electrical systems, an important feature since trucks are about equally divided between positive and negative ground systems.

In the drawing

Figure 5:
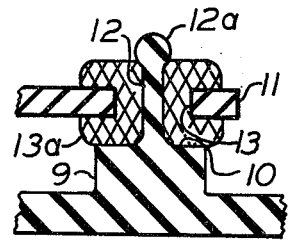
Figure 2:
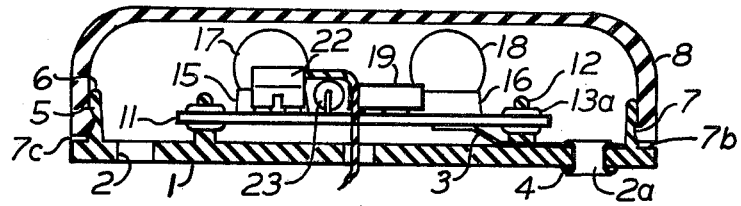
Figure 6:
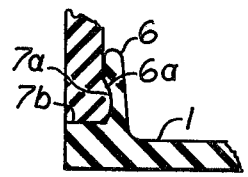
Figure 4:
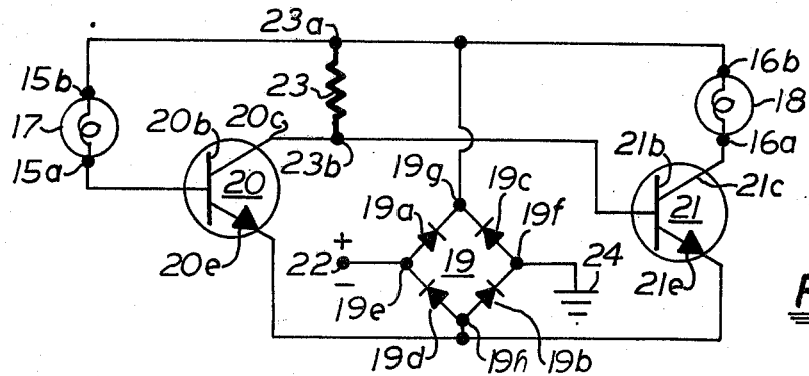
Figure 3:
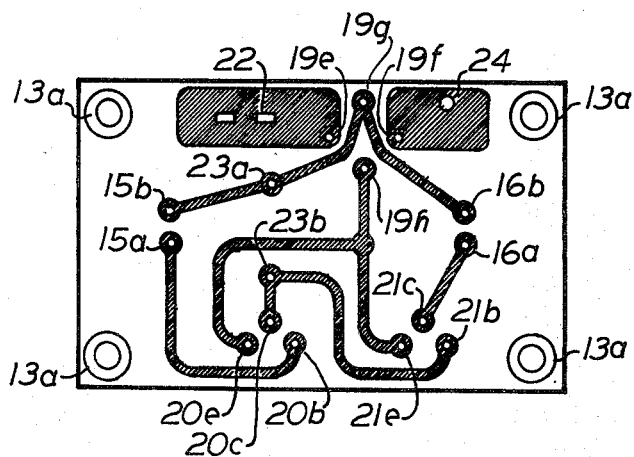

FIG. 1 is a top plan view of a preferred form of marker light with the lens removed, FIG. 2 is a section of line 2—2 of FIG. 1 with the lens in place, FIG. 3 is a bottom plan view of the printed circuit board carrying the lamps and the circuit in the connections, FIG. 4 is a circuit diagram, FIG. 5 is a section through one of the supports for the printed circuit board, FIG. 6 is a section of the lens mounting.

The light has a plastic base 1 with mounting holes 2 and 2a at opposite ends for screws for attachment to a trailer body or frame. A ground strap 3 has an eyelet 4 in the hole 2a. Around the periphery of the base is an upstanding rim 5 having a bead 6 at its upper edge which makes a weathertight fit with the rim 7 of a lens 8. As shown in FIG. 6 the bead 6 and rim 7 have interengaging cam surfaces 6a, 7a which hold the rum 7 tight against a shoulder 7b on the base and prevents removal of the lens under shocks and vibrations encountered in service. The weather resistant plastic used for the lens and base are sufficiently yieldable to allow the lens to be pried off the base by a screwdriver inserted into one of the notches 7c in the shoulder 7b. On the bottom wall of the base are integral upstanding studs 9 having shoulders 10 for supporting a printed circuit board 11 in the optically required relation to the lens 8. The printed circuit board is fastened to the base by projections 12 on the studs which extend through and have an interference fit in rubber grommets 13a in mounting holes 13. When the board grommets 13a are seated on the shoulders 10 the interference fit produces a grip on the projections 12 tight enough to prevent unwanted removal during service. Enlarged heads 12a assist in preventing removal of the board.

On the upper side of the printed circuit board 11 are sockets 15, 16 for lamps 17, 18. The lamp 17 is is supplied by current through conductors 15a, 15b. The lamp 18 is supplied by conductors 16a, 16b.

The power to the lamps is fed through a full wave bridge rectifier 19 consisting of rectifier elements 19a, 19b, 19c, 19d and a solid state switching circuit consisting of transistors 20, 21 and a resistor 23 connected across the output of rectifier 19 as shown in FIGS. 3 and 4. The rectifier 19 has input terminals 19e and 19f connected to power imput terminal 22 and ground terminal 24 and output terminal 19g connected to lamp socket terminals 15b and 16b and output terminal 19h connected to transistor emitter electrodes 20e and 21e. Resistor 23 has leads 23a and 23b respectively to the rectifier output terminals 19g and to transistor electrodes 20c and 21b. For trucks with negative ground, the power input terminal 22 is positive with respect to ground 24 and current for the lamp 17 flows through rectifier 19a to the lamp and from the lamp through base and emitter electrodes 20b and 20e of transistor 20 and through rectifier 19b to ground. For trucks with positive ground, ground is positive with respect to power input terminal 22, and current flows from ground through rectifier 19c to the lamp 17 from the lamp 17 through base and emitter electrodes 20b and 20e of transistor 20 and through rectifier 19d to the terminal 22.

When the marker light is first installed, current is compelled to flow through lamp 17 because transistor 21 is biased off by connection of collector electrode 20c of transistor 20 to the base electrode 21b of transistor 21. When the filament of lamp 17 burns out the voltage from resistor 23 biases the base electrode of transistor 21 on and causes the flow of current to immediately switch to lamp 18 and to flow through the collector electrode 21c and emitter electrode 21e either to ground 24 through rectifier 19b when terminal 22 is positive or to terminal 22 through rectifier 19d when terminal 22 is negative. While both lamps 17, 18 are subject to shock and vibrations incident to the use of the truck, the filament of lamp 18 is not affected while the lamp 17 is lighted. The solid state switching means and the other parts carried by the board 13 are so rugged as to be insensitive to shocks and vibration. As manufactured, the filament of lamps 17 and 18 are ductile. Embrittlement starts the moment a lamp is lighted and progresses until the filament breaks. When the lamp 18 is switched on, it has a life expectancy equal to lamp 17. The result is that the life of the marker light is substantially doubled. Since the cost of replacing a single lamp on the road greatly exceeds the cost of the entire marker light, doubling the life is very important. In most cases, the subject marker light will not require any lamp replacement between major overhauls when the truck or trailer is returned to the shop for extensive rebuilding.

The printed circuit board 11 and the supporting grommets still further increase the lamp filament life by reducing the transmission of vibrations in accordance with the formula $P = 103.254 - (0.420/S)$ where $P = \%$ reduction in transmission of vibration and $S =$ static deflection in inches of the grommets under the weight of the printed circuit board and the lamp carried thereby. For a static deflection of 0.01 inches, the percentage reduction is 60% and the effect of the 60% of reduction is to increase the filament life up to 500%. A static deflection of 0.01 inches does not significantly change the relation of the lamps to the lens 8 and therefore has negligible effect on the photometric measurements of light intensity from the light.

The light can be used interchangeably with all existing marker lights without regard to the polarity of the electrical system and will increase the service life by a factor of 3.5 to 10, a major improvement.

The printed circuit board 13 when solidly mounted on parts 9 without the grommets increases the service of each lamp from 25-30%. The glass fiber epoxy or equivalent board material required to prevent water absorption has inherent vibration and shock isolation properties which help protect the lamp filaments. If the mountings 13a were omitted the service life of the marker light would be increased by a factor of from 2 to 2.5.

I claim:

1. A marker light for trucks, semi-trailers and the like having electrical systems with either positive or negative ground comprising a base having means for mounting the same on a truck, a lens mounted on the base, lamp supporting means, means for mounting the lamp supporting means on the base, said lamp supporting means having first and second lamp sockets for receiving first and second incandescent lamps, a ground terminal adapted to be connected to the truck electrical system ground, a power terminal adapted to be connected to the live terminal of the truck electrical system, a first transistor, a second transistor, a full wave bridge rectifier having its input connected across said power and ground terminals and having its output connected in series through the base and emitter of said first transistor to the first lamp socket and the filament of its lamp and also having its output connected in series through the collector and emitter of said second transistor to the second lamp socket and the filament of its lamp, a connection from the collector of the first transistor to the base of the second transistor for biasing the second transistor off only while the first transistor is on and current is flowing through the first transistor as would be the case when the filament of the first lamp is unbroken, and a bias resistor connected to the base of the second transistor for biasing said second transistor on, the bias from said resistor being overcome by the bias from said first transistor when said first transistor is on and conducting current through the filament of the first lamp.

2. The light of claim 1 in which the means for mounting the lamp supporting means is further defined as rubber mountings.

3. The light of claim 1 in which the lamp supporting means is further defined as a printed circuit board having rubber grommets in supporting relation between it and the base.

* * * * *